US012060260B2

(12) United States Patent
Chang

(10) Patent No.: US 12,060,260 B2
(45) Date of Patent: Aug. 13, 2024

(54) STIRRUP HAVING DEFORMABLE AND DETACHABLE STRUCTURE

(71) Applicant: JONE SHOU INDUSTRIAL CO., LTD., Caotun Township, Nantou County (TW)

(72) Inventor: Chih Shun Chang, Caotun Township, Nantou County (TW)

(73) Assignee: JONE SHOU INDUSTRIAL CO., LTD., Nantou County (TW)

( * ) Notice: Subject to any disclaimer, the term of this patent is extended or adjusted under 35 U.S.C. 154(b) by 0 days.

(21) Appl. No.: 18/085,961

(22) Filed: Dec. 21, 2022

(65) Prior Publication Data

US 2024/0208797 A1 Jun. 27, 2024

(51) Int. Cl.
*B68C 3/00* (2006.01)
*B68C 3/02* (2006.01)

(52) U.S. Cl.
CPC ........ *B68C 3/02* (2013.01); *B68C 2003/0058* (2013.01)

(58) Field of Classification Search
None
See application file for complete search history.

(56) References Cited

U.S. PATENT DOCUMENTS

| | | | | |
|---|---|---|---|---|
| 4,969,316 A * | 11/1990 | Brown | ........................ | B68C 3/02 54/49 |
| 2008/0104934 A1* | 5/2008 | Morin | ........................ | B68C 3/02 54/49 |
| 2017/0341925 A1* | 11/2017 | Barea | ........................ | B68C 3/02 |
| 2019/0144259 A1 | 5/2019 | Benetti | | |

FOREIGN PATENT DOCUMENTS

| | | | | |
|---|---|---|---|---|
| DE | 4432871 B4 * | 10/1993 | ............... | B68C 3/00 |
| IT | 3305718 A1 * | 4/2018 | ............... | B68C 3/00 |
| IT | 3786107 A1 * | 3/2021 | ............... | B68C 3/02 |

* cited by examiner

*Primary Examiner* — Joshua J Michener
*Assistant Examiner* — Henry Hooper Mudd
(74) *Attorney, Agent, or Firm* — MUNCY, GEISSLER, OLDS & LOWE, P.C.

(57) ABSTRACT

A stirrup having a deformable and detachable structure includes a frame, a pedal, and a side arm. The frame is C-shaped and has a first end and a second end. An opening is defined between the first end and the second end. The second end has a first coupling portion. The pedal is disposed on a bottom of the frame. The side arm is made of a flexible material and located at the opening of the frame. The side arm has a second coupling portion. A connecting member is configured to connect the first coupling portion and the second coupling portion. When a sufficient force is applied on the inner side of the side arm to curve and deform the side arm, the side arm is rotatable relative to the frame with a joint of the first coupling portion and the second coupling portion as a pivot.

10 Claims, 15 Drawing Sheets

STIRRUP HAVING DEFORMABLE AND DETACHABLE STRUCTURE

FIELD OF THE INVENTION

The present invention relates to a stirrup, and more particularly to a stirrup having a deformable and detachable structure.

BACKGROUND OF THE INVENTION

A conventional stirrup structure, as disclosed in US Patent Application Publication No. US2019/0144259A1, includes a C-shaped frame, a swing arm and a pedal. The frame has a through hole for a strap to pass through the stirrup, such that the stirrup is connected to a horse saddle. One end of the swing arm is pivoted to the upper end of the opening of the frame, and the other end of the swing arm is locked to the lower end of the opening of the frame. The pedal is fixed on the bottom of the frame. When the rider is in danger and intends to dismount the horse, the rider can kick the swing arm outwardly with his/her foot to separate the swing arm from the buckle of the frame. Thus, the rider can move his/her foot out of the stirrup and then dismount from the horse.

However, the pivot of the swing arm and the frame is close to the upper end of the opening of the frame. If the rider kicks the swing arm close to the pivot, the moment is shorter, so the rider has to kick harder to separate the swing arm from the buckle of the frame. As a result, it is not easy for the rider to move his/her foot out of the stirrup. The swing arm of the conventional stirrup is pivoted only at the pivot, so it is opened and closed in a single direction. In case of danger, if the rider does not kick the swing arm in this direction, it will hinder the rider from moving his/her foot out of the stirrup. In addition, with the pivotal design, the structure of the stirrup is complicated and difficult to maintain.

SUMMARY OF THE INVENTION

The primary object of the present invention is to provide a stirrup having a deformable and detachable structure for a rider to move his/her foot out of the stirrup when he/she is in danger, thereby improving the safety of horse riding.

In order to achieve the foregoing object, the present invention provides a stirrup having a deformable and detachable structure. The stirrup comprises a frame, a pedal, and a side arm. The frame is C-shaped and has a first end and a second end facing the first end. An opening is defined between the first end and the second end. The frame has a first coupling portion adjacent to a bend of the second end. The frame surrounds a space. The second end of the frame has an upper end face, an inner wall adjacent to the upper end face, and an outer retaining wall opposite to the inner wall. The upper end face has a recess extending downward. The inner wall has a notch communicating with the recess. The outer retaining wall is higher than the inner wall below a bottom edge of the notch in height. The pedal is disposed on a bottom of the frame. The side arm is made of a flexible material. The side arm has a second coupling portion. A connecting member is configured to connect the first coupling portion and the second coupling portion. The side arm has an inner side facing the space. The inner side of the side arm has a plurality of indents arranged at intervals. The side arm further has a protrusion adjacent to one side of the second coupling portion. A groove is formed between the protrusion and the second coupling portion.

In a first state, the second coupling portion of the side arm is coupled to the first coupling portion of the frame, and the side arm is installed at the opening of the frame. When the protrusion of the side arm is engaged in the recess of the frame, the outer retaining wall of the frame is engaged with the groove of the side arm.

In a second state, when an outward force is applied to the inner side of the side arm, the side arm is curved and deformed outwardly via the indents.

In a third state, when the side arm is continuously curved and deformed outwardly by the outward force, the protrusion of the side arm is disengaged from the recess of the frame, the outer retaining wall of the frame is disengaged from the groove of the side arm, and the side arm is rotatable relative to the frame with a joint of the first coupling portion and the second coupling portion as a pivot.

DETAILED DESCRIPTION OF THE PREFERRED EMBODIMENTS

Figure 1:
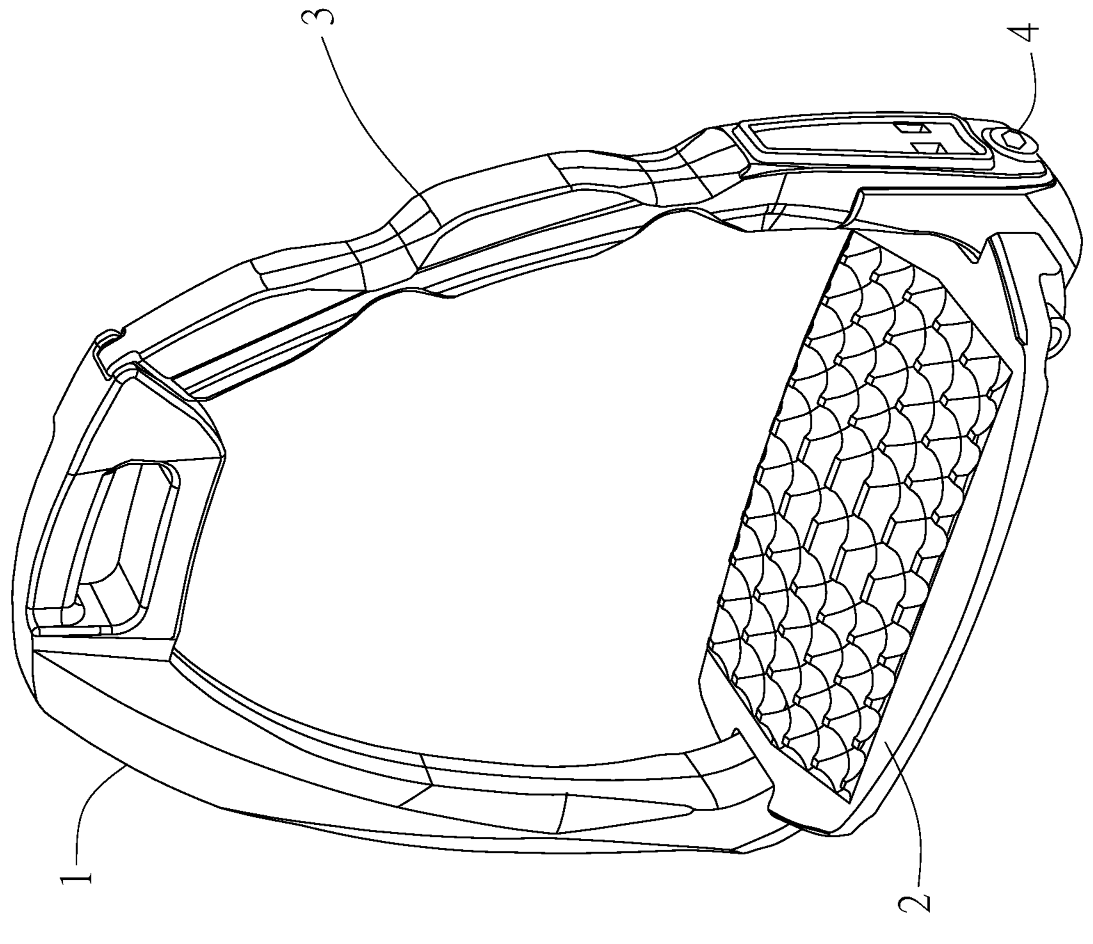
FIG. 1 is a perspective view according to a first embodiment of the present invention.
Figure 2:
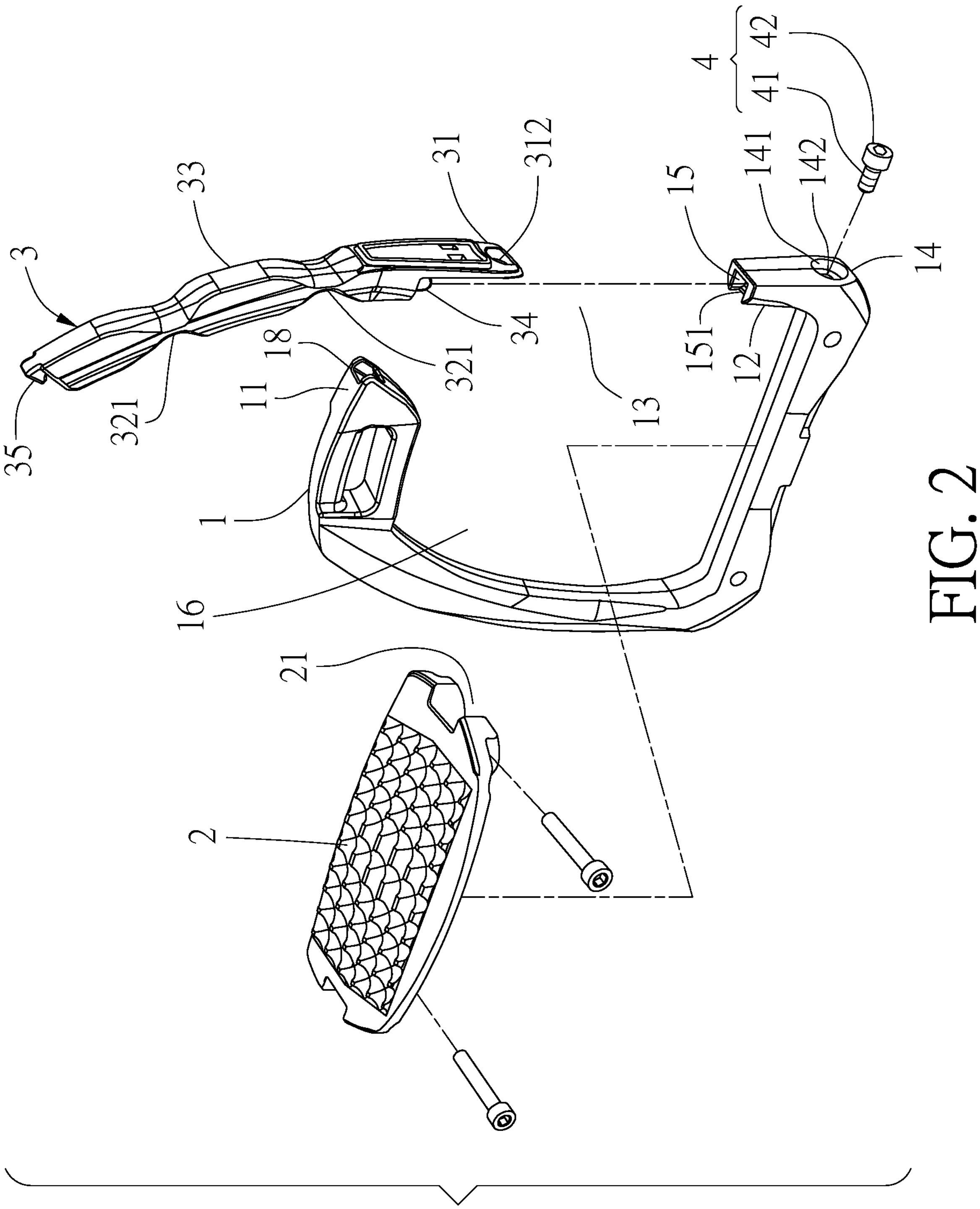
FIG. 2 is an exploded view according to the first embodiment the present invention.

Referring to FIGS. 1 to 12, a stirrup having a deformable and detachable structure according to a first embodiment of the present invention comprises a frame 1, a pedal 2 and a side arm 3.

The frame 1 is C-shaped and has a first end 11 and a second end 12 facing the first end 11. An opening 13 is defined between the first end 11 and the second end 12. The frame 1 surrounds a space 16 for a rider to move his/her foot in the space 16. The second end 12 has a first coupling portion 14. The first coupling portion 14 is recessed to form a chamber 141. A first coupling hole 142 is formed in the bottom of the chamber 141. The second end 12 of the frame 1 has an upper end face 123, an inner wall 121 adjacent to the upper end face 123, and an outer retaining wall 122 opposite to the inner wall 121. The upper end face 123 has a recess 15 extending downward. The inner wall 121 of the second end 12 of the frame 1 has a notch 151 communicating with the recess 15 and the space 16. The outer retaining wall 122 of the second end 12, away from the space 16, is higher than the inner wall 121 below the bottom edge of the notch 151 in height.

A transverse groove 21 extending horizontally is formed on the underside of the pedal 2. The transverse groove 21 of the pedal 2 is fitted on the outer periphery of the bottom 17 of the frame 1. The pedal 2 is locked to the frame 1 by a plurality of locking members for supporting the foot of the rider.

Figure 9:
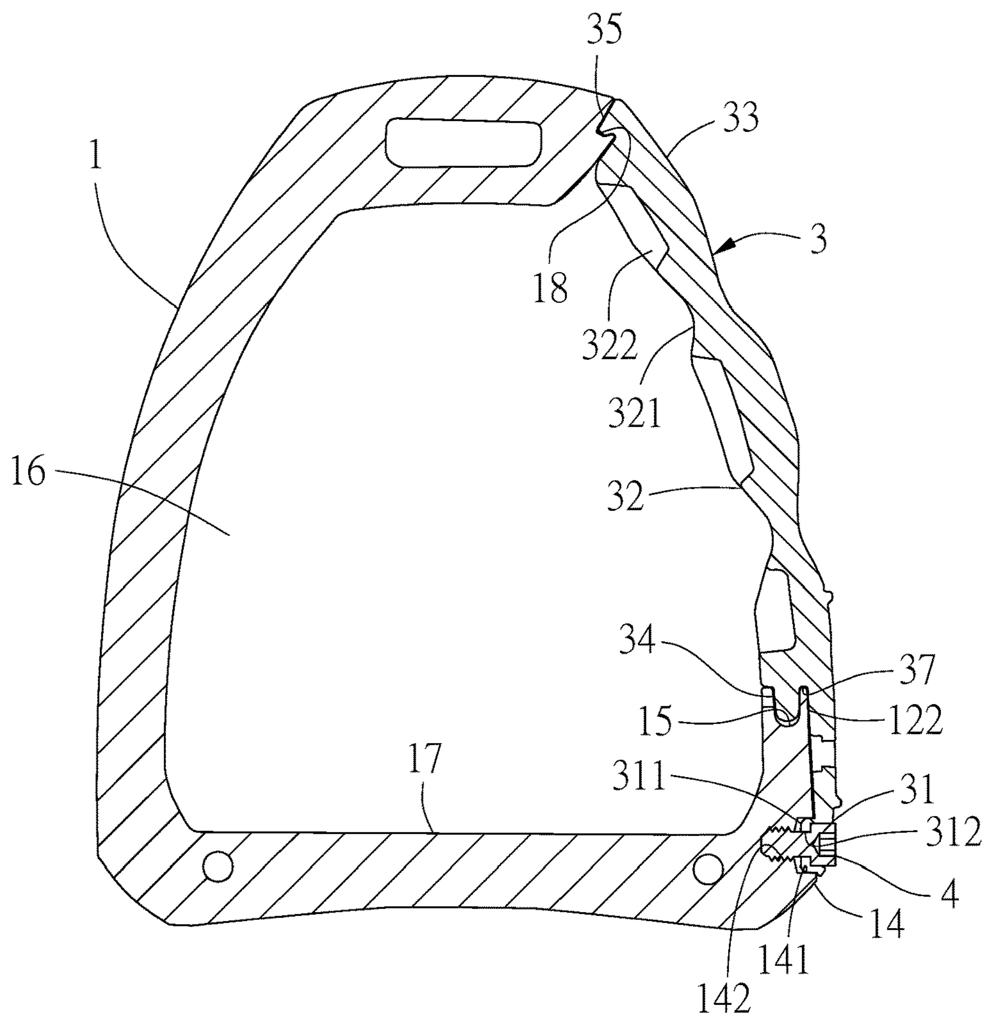
FIG. 9 is a cross-sectional view according to the first embodiment the present invention.

The side arm 3 extends along a long axis thereof. The side arm 3 is made of a flexible material, so it is flexible and curved. The side arm 3 is located at the opening 13 of the frame 1 to close the opening 13. One end of the side arm 3 has a second coupling portion 31 matched with the first coupling portion 14. The second coupling portion 31 has a flange 311 extending towards the chamber 141 of the first coupling portion 14. The flange 311 corresponds in shape to the chamber 141 for the flange 311 to be engaged with the chamber 141, as shown in FIG. 9. The second coupling portion 31 further has a second coupling hole 312 passing through the flange 311. When the side arm 3 is installed on the frame 1, the second coupling hole 312 communicates with the first coupling hole 142. The side arm 3 has an inner side 32 facing the space 16 and an outer side 33 opposite to the inner side 32. The inner side 32 and the outer side 33 opposite to the inner side 32 each have a plurality of indents 321 arranged at intervals. When a force is applied to the side arm 3, the side arm 3 is curved outwardly via the indents 321. The inner side 32 of the side arm 3 has a plurality of elongate holes 322 adjacent to the respective indents 321 along the long axis of the side arm 3, so as to reduce the weight of the side arm 3. The side arm 3 further has a protrusion 34 adjacent to one end of the second coupling portion 31. The protrusion 34 corresponds in shape to the recess 15 for the protrusion 34 to be engaged with the recess 15. The protrusion 34 is spaced apart from the second coupling portion 31 to form a groove 37 for the outer retaining wall 122 of the second end 12 to be engaged with the groove 37.

In addition, the present invention further has a connecting member 4. The connecting member 4 is configured to connect the first coupling portion 14 and the second coupling portion 31. In this embodiment, the connecting member 4 is a screw. The screw has a threaded section 41 and a head 42. The threaded section 41 is to be screwed into the first coupling hole 142 and the second coupling hole 312. The head 42 is located adjacent to the second coupling portion 31. When the threaded section 41 of the connecting member 4 is screwed into the second coupling hole 312 and the first coupling hole 142 in sequence to connect the first coupling portion 14 and the second coupling portion 31, the inner edge of the head 42 leans against but is not tightly pressed against the outer side of the second coupling portion 31, so that the side arm 3 is coupled to the second end 12 of the frame 1, and the side arm 3 is rotatable relative to the frame 1 with the joint of the first coupling portion 14 and the second coupling portion 31 as a pivot.

Figure 3:
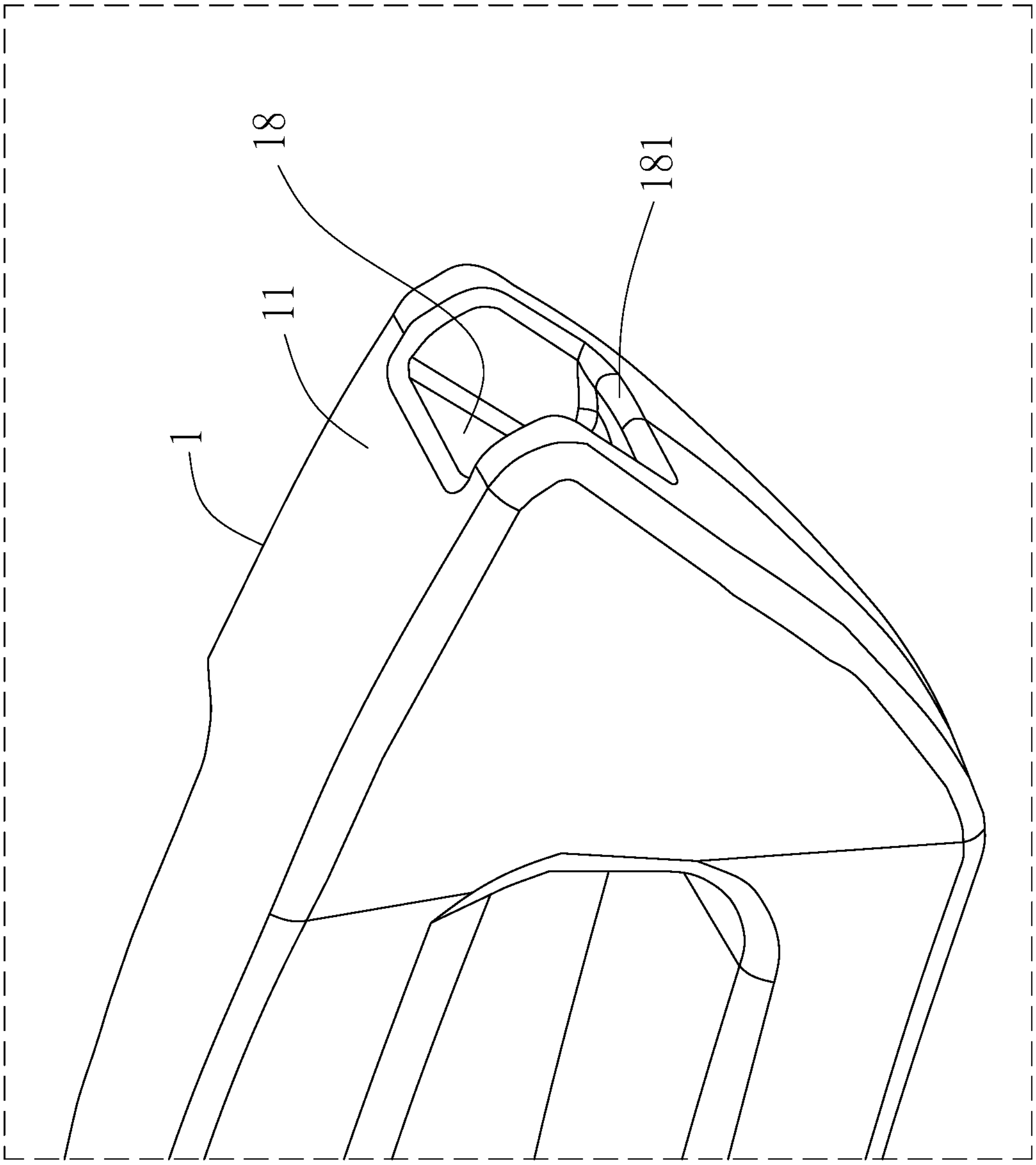
FIG. 3 is a partial enlarged view of the frame according to the first embodiment the present invention.
Figure 4:
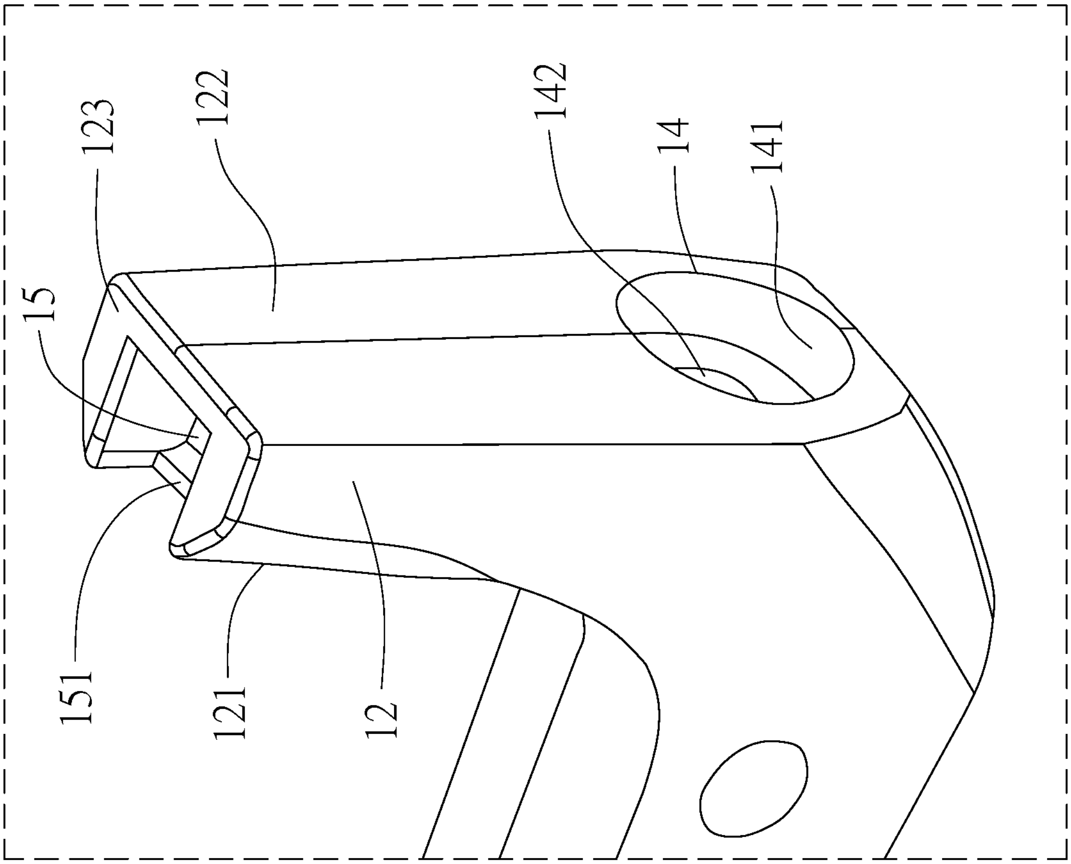
FIG. 4 is another partial enlarged view of the frame according to the first embodiment the present invention.
Figure 5:
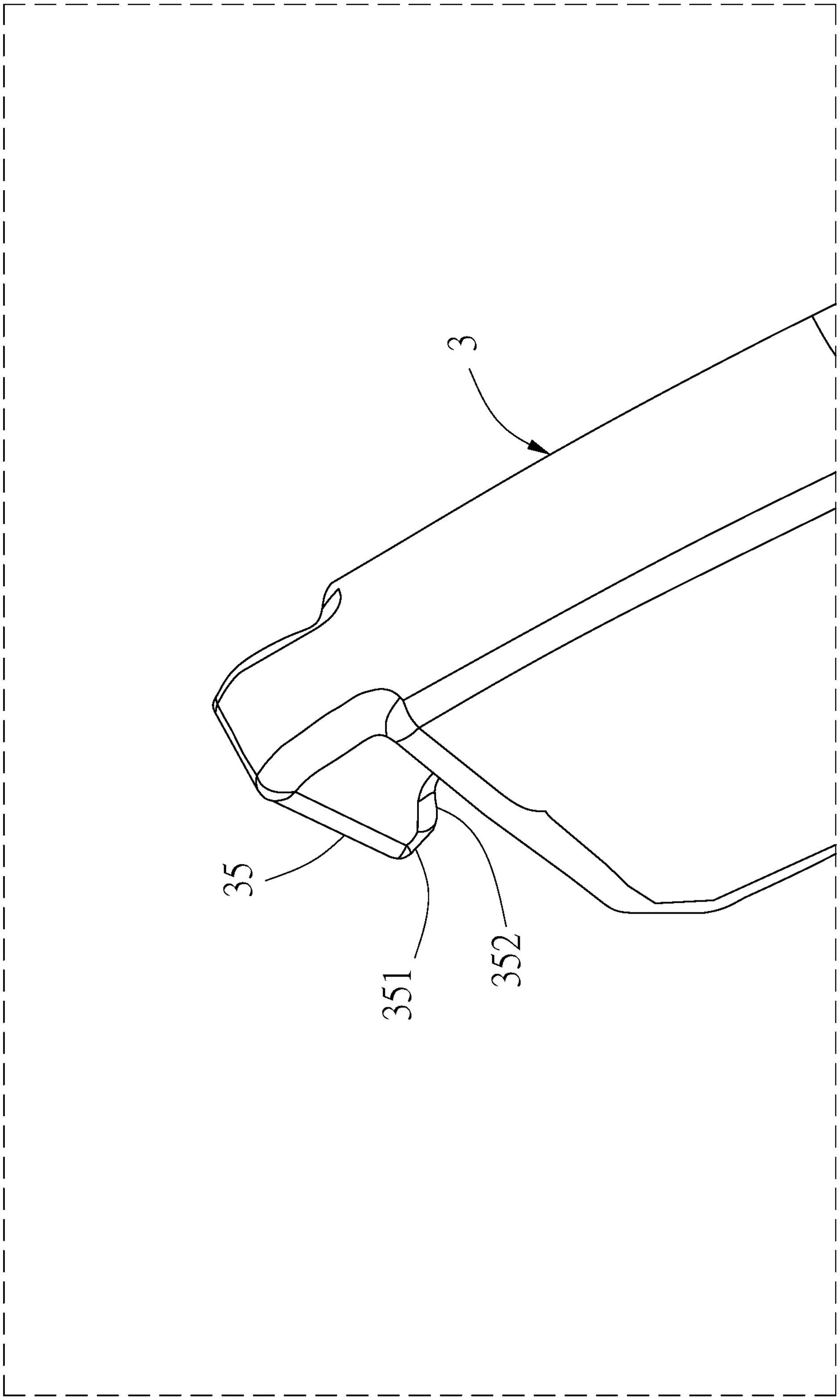
FIG. 5 is a partial enlarged view of the side arm according to the first embodiment the present invention.
Figure 6:
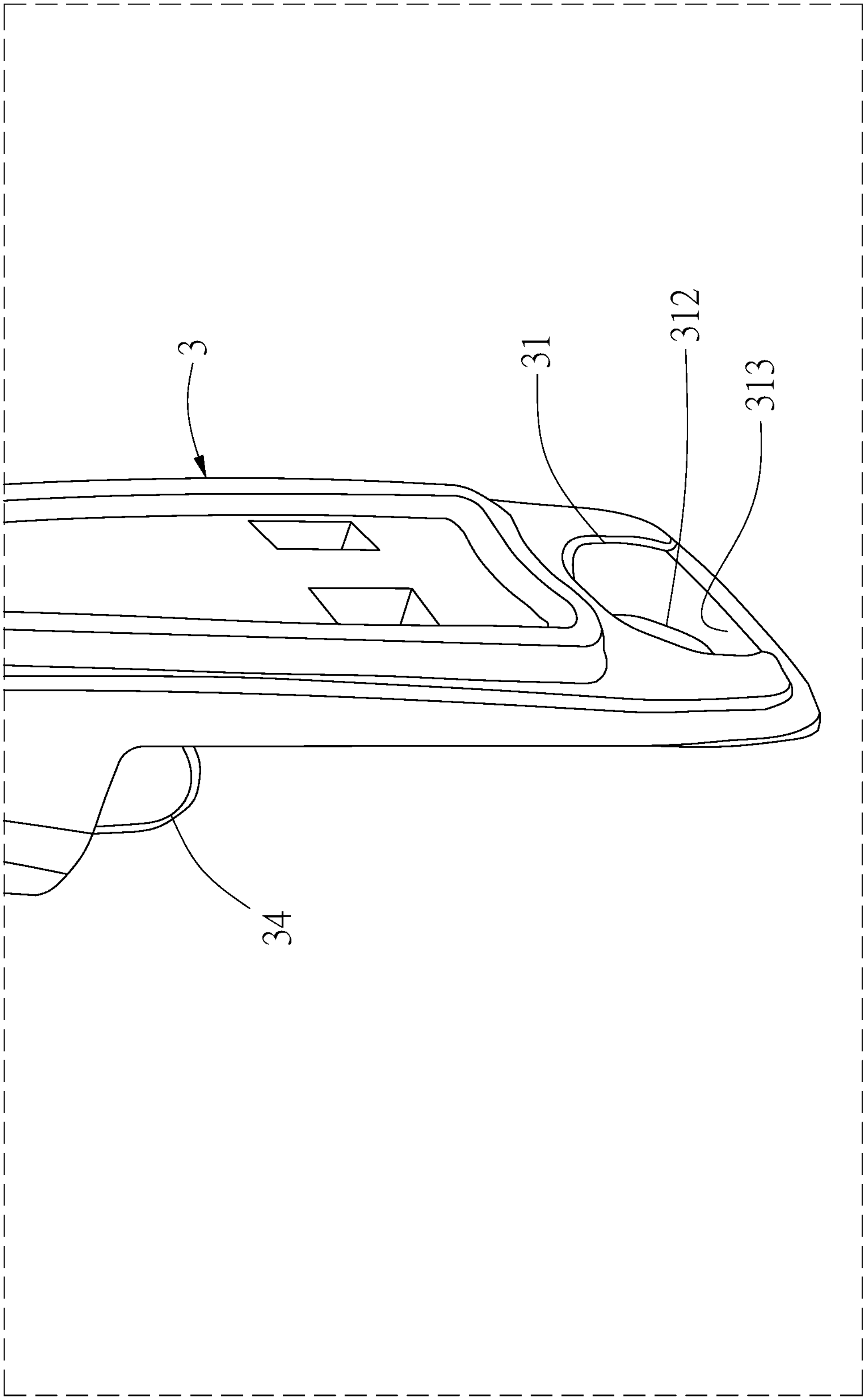
FIG. 6 is another partial enlarged view of the side arm according to the first embodiment the present invention.
Figure 7:
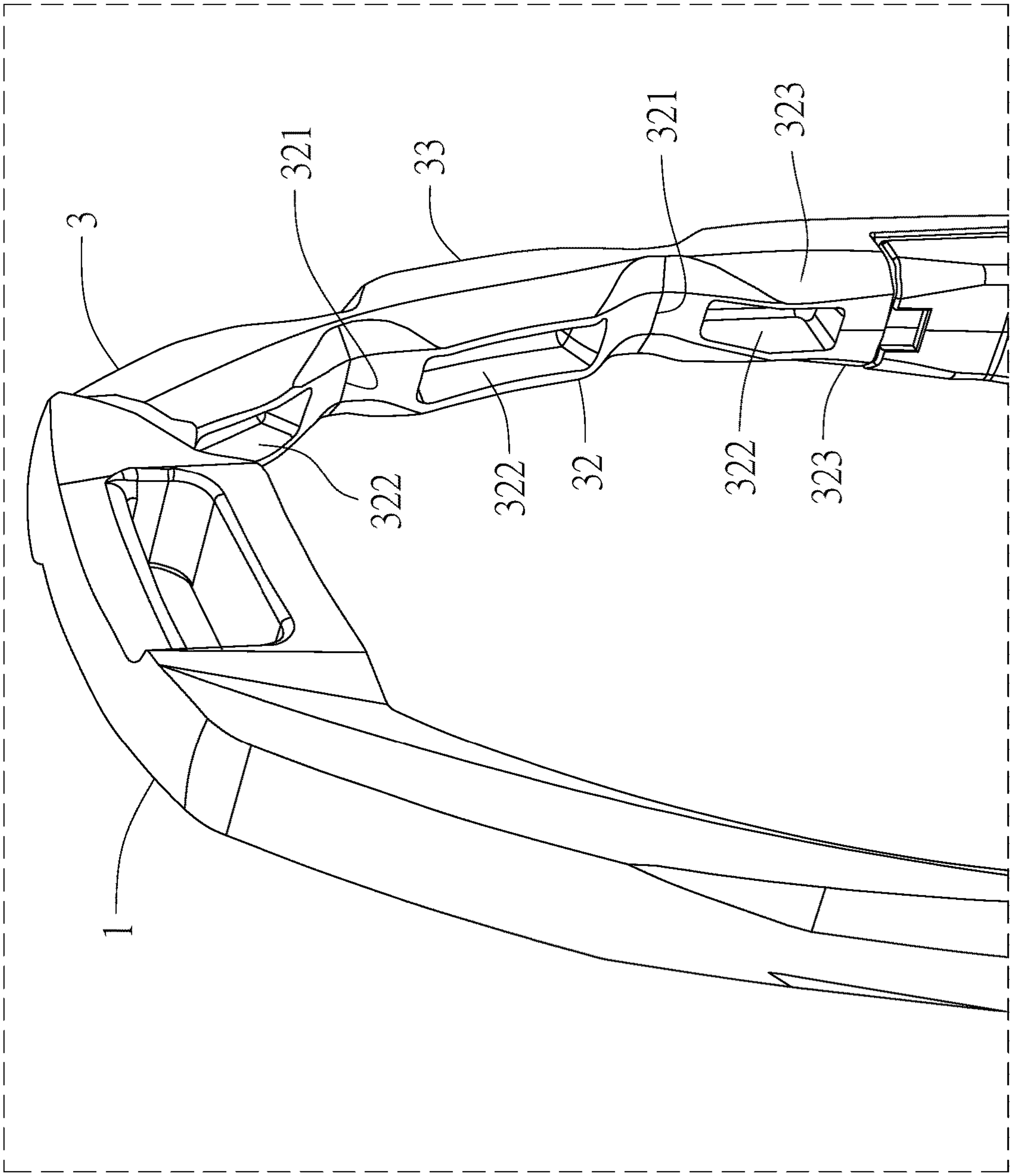
FIG. 7 is a partial enlarged view according to the first embodiment the present invention after being assembled.

Referring to FIG. 3 and FIG. 5, in the first embodiment, the first end 11 of the frame 1 further has an engaging groove 18, and one end of the side arm 3, away from the second coupling portion 31, has an engaging block 35. The engaging block 35 is hook-shaped and has a hook portion 351. An alcove 352 is formed between the hook portion 351 and the side arm 3. The engaging groove 18 has a raised portion 181 to cooperate with the alcove 352 for the engaging block 35 to be engaged with the engaging groove 18.

Furthermore, the corner of the inner side 32 of the side arm 3, adjacent to of the recess 15, is chamfered to form at least one chamfer 323. When the user kicks the side arm 3 obliquely, a force that is perpendicular to the direction of the chamfer 323 is exerted on the chamfer 323, so that the protrusion 34 and the engaging block 35 can be easily disengaged from the recess 15 and the engaging groove 18 respectively for the rider to move his/her foot out of the stirrup.

Preferably, the outer contours of the protrusion 34 and the engaging block 35 are arc-shaped and chamfered. With the chamfering design, when the rider needs to move his/her foot out of the stirrup, the protrusion 34 and the engaging block 35 can be disengaged from the recess 15 and the engaging groove 18 smoothly, without applying too much force.

Besides, the outer retaining wall 122 of the second end 12, away from the space 16, is higher than the inner wall 121 below the notch 151 in height. Thus, when the protrusion 34 is inserted into the recess 15, the outer retaining wall 122 of the second end 12 can be engaged with the groove 37 deeply, so that the side arm 3 and the frame 1 can be connected more firmly for riding a horse.

When the first embodiment of the present invention is actually used, the rider puts his/her foot in the space 16 of the stirrup and steps on the pedal 2. As shown in FIG. 9, in a first state, the second coupling portion 31 of the side arm 3 is coupled to the first coupling portion 14 of the frame 1, and the side arm 3 is installed at the opening 13 of the frame 1. When the protrusion 34 of the side arm 3 is in the recess 15 of the frame 1, the outer retaining wall 122 of the frame 1 is engaged with the groove 37 of the side arm 3.

Figure 10:
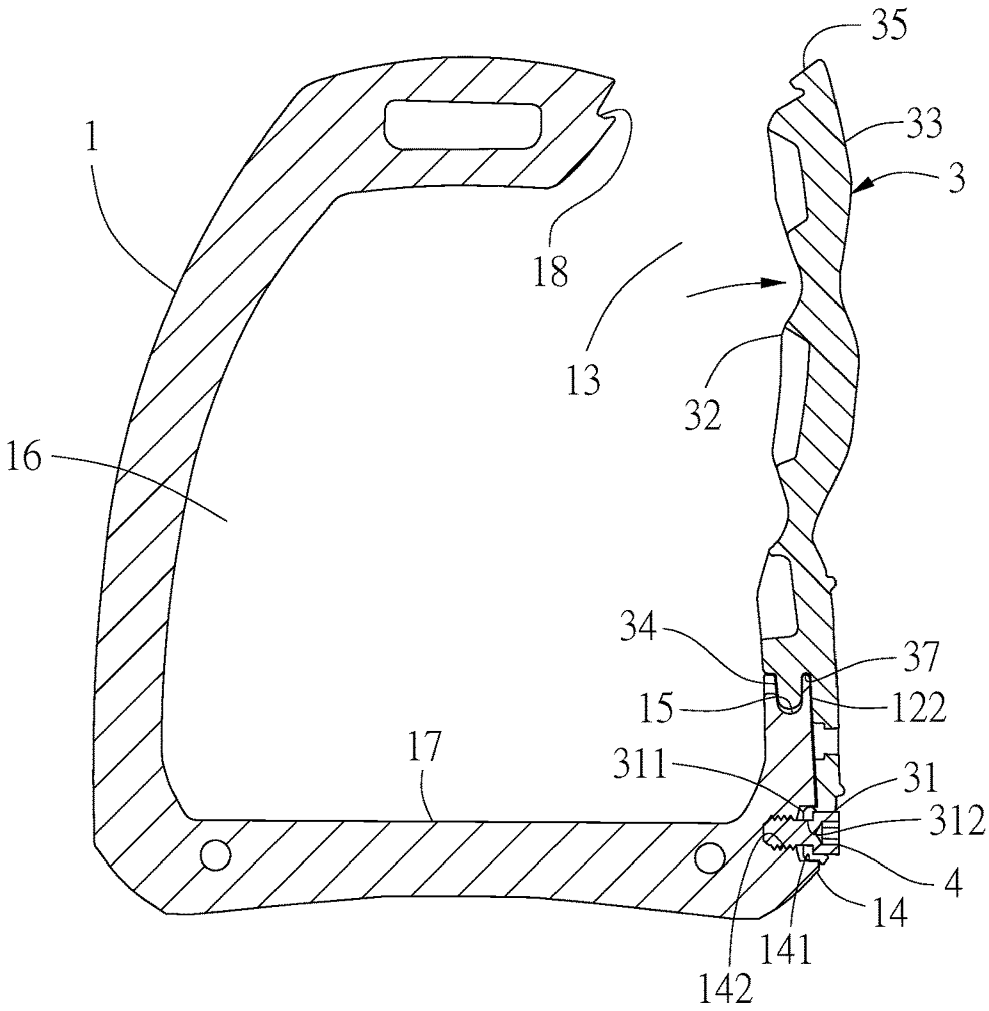
FIGS. 10-12 are schematic views illustrating the operation of the first embodiment the present invention.

As shown in FIG. 10, in a second state, when the rider is about to be in danger and intends to dismount the horse, the rider applies a sufficient force to the inner side 32 of the side arm 3 from the space 16 with his/her foot so that the side arm 3 is curved and deformed outwardly via the indents 321, and the engaging block 35 is completely disengaged from the engaging groove 18.

Figure 11:
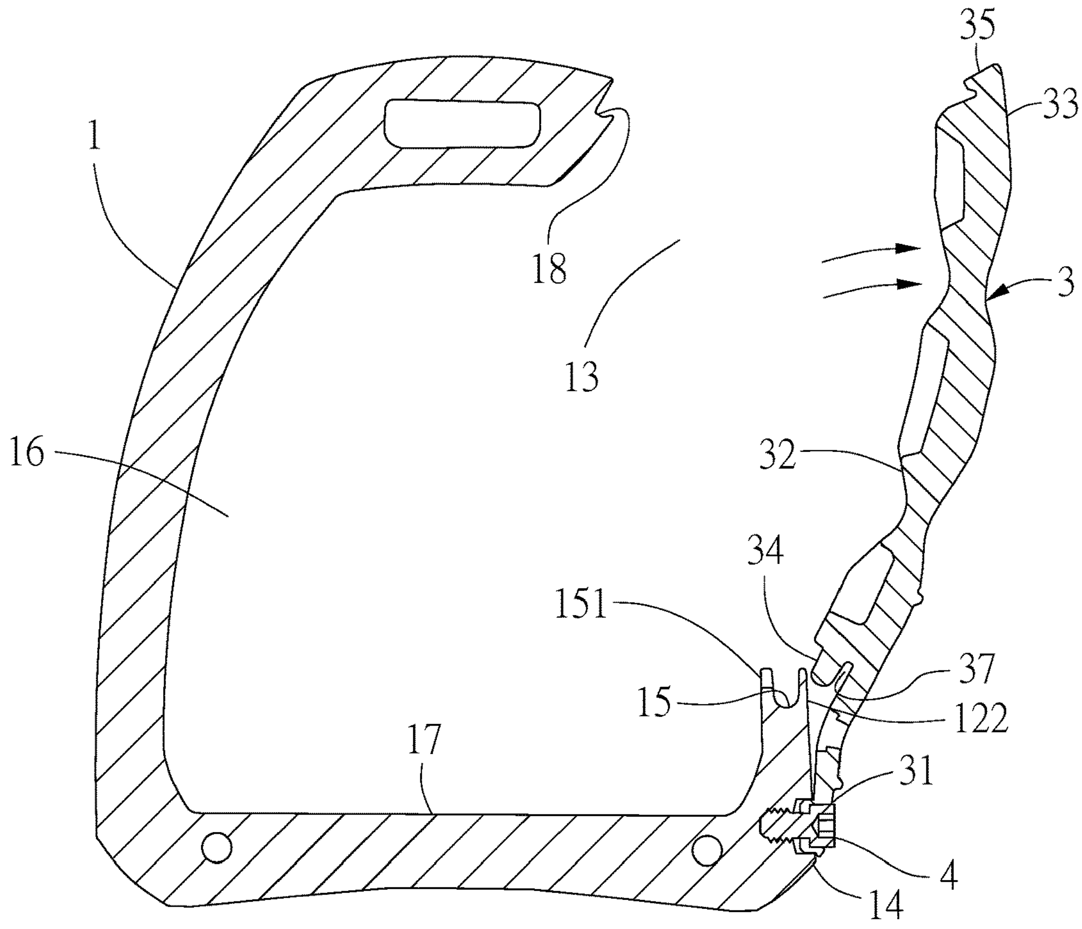

As shown in FIG. 11, in a third state, the side arm 3 is continuously curved and deformed outwardly by the applied force. When the applied force reaches a certain level, the protrusion 34 releases the outer retaining wall 122 and completely disengages from the recess 15, so that the outer retaining wall 122 of the frame 1 is disengaged from the groove 37 of the side arm 3.

Figure 12:
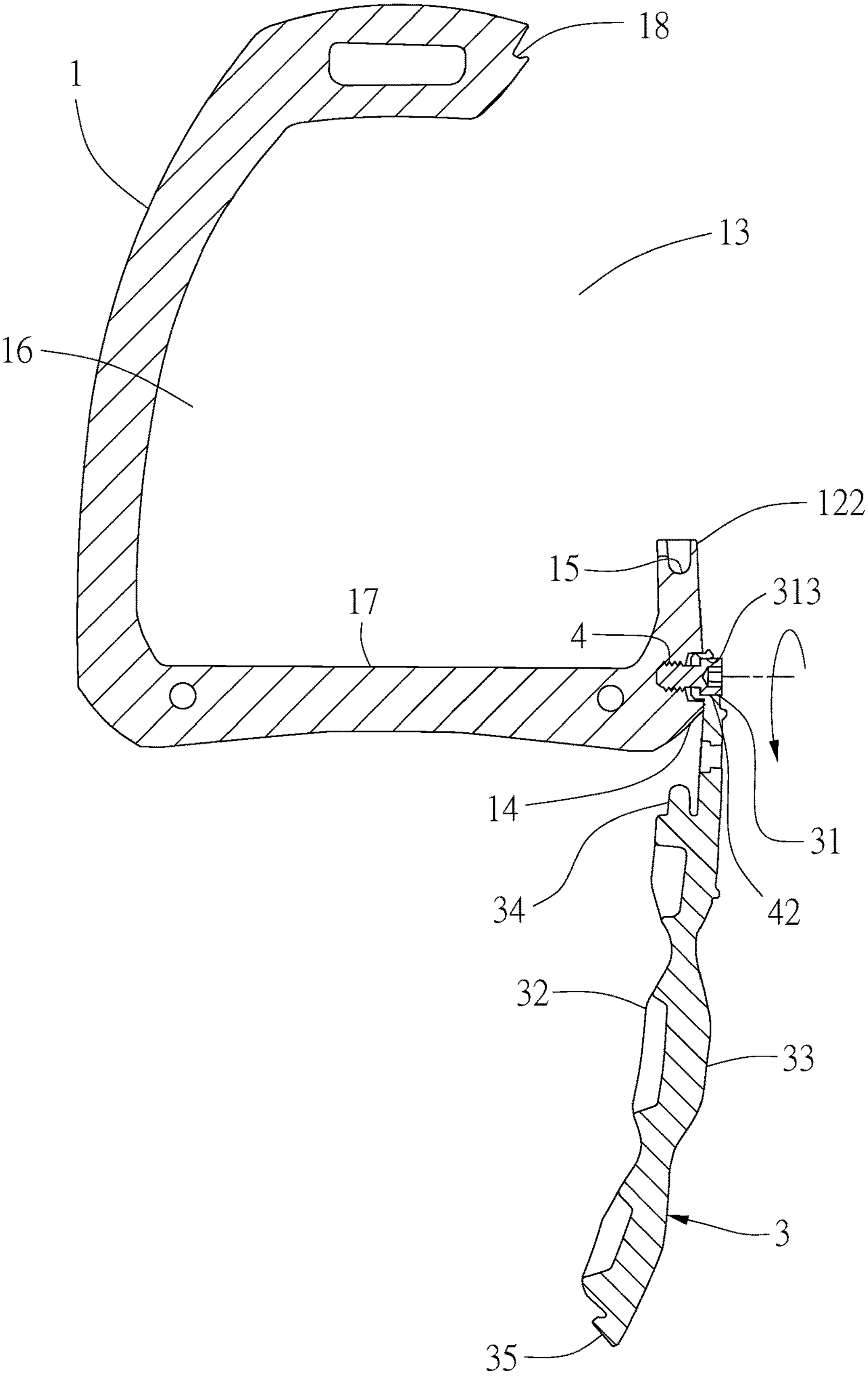

As shown in FIG. 12, when the side arm 3 is released from the two ends of the frame 1, because the inner edge of the head 42 of the connecting member 4 leans against but is not tightly pressed in a cavity 313 of the second coupling portion 31, only the second coupling portion 31 of the side arm 3 is connected to the frame 1, and the side arm 3 is rotatable relative to the frame 1 with the joint of the first coupling portion 14 and the second coupling portion 31 as the pivot. Thus, the opening 13 is fully open, and the rider can remove his/her foot out of the stirrup from the space 16 to prevent injury.

It should be noted that another reason why the inner side 32 of the side arm 3 is formed with the indents 321 is that when the rider is in danger and kicks the side arm 3, his/her foot can kick the indents 321 with ease. This can prevent the foot of the rider from sliding on the inner side of the side arm 3 when the rider kicks the side arm, so that the point of application of the kick is more concentrated.

Figure 8:
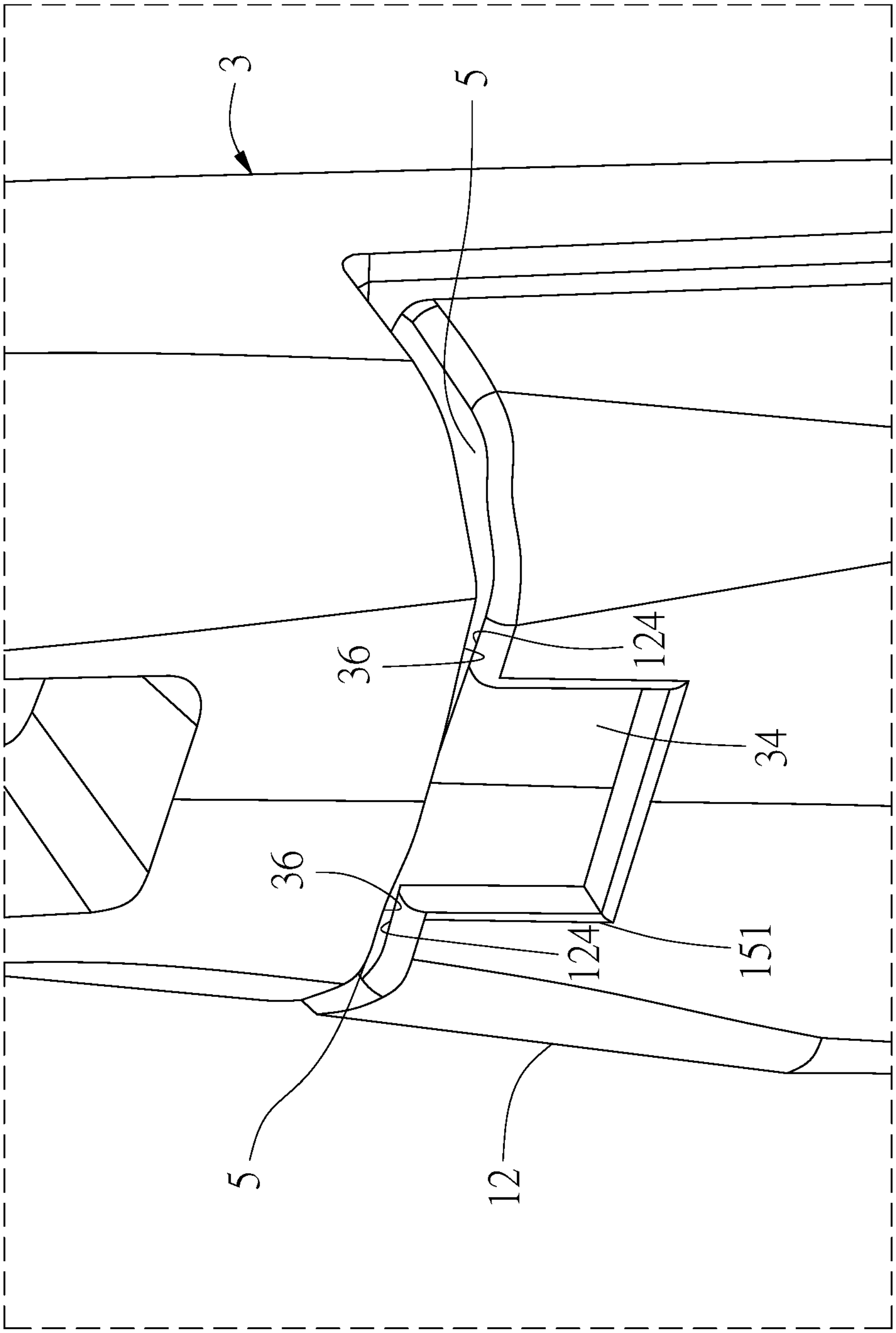
FIG. 8 is a partial enlarged view of FIG. 7.

Furthermore, as shown in FIG. 8, the center of the end face of the side arm 3, adjacent to the second end 12 of the frame 1, bulges outwardly to form a first oblique conical surface 36. The second end 12 of the frame 1 also bulges outwardly to form a second oblique conical surface 124 opposite the first oblique conical surface 36 of the side arm 3. The top ends of the first oblique conical surface 36 and the second oblique conical surface 124 abut against each other, so that a plurality of gaps 5 are formed between the first oblique conical surface 36 and the second oblique conical surface 124.

With the configuration of the oblique conical surfaces, when the rider kicks the side arm of the stirrup outwardly, the side arm 3 is curved and deformed by the force applied by the rider, so that the protrusion 34 is disengaged from the recess 15. Through the gaps 5 formed between the frame 1 and the side arm 3, the side arm 3 will not interfere with the second end 12 of the frame 1 in the process that the protrusion 34 is to disengage from the recess 15. Thereby, the protrusion 34 can be disengaged from the recess 15 more smoothly.

With the structure of the present invention, when the rider is in danger and intends to dismount the horse, through the chamfer 323 formed on the corner of the inner side 32 of the side arm 3 adjacent to the recess 15, the rider kicks the side arm 3 obliquely to apply a force that is perpendicular to the direction of the chamfer 323 on the chamfer 323, so that the protrusion 34 and the engaging block 35 can be easily disengaged from the recess 15 and the engaging groove 18 respectively for the rider to move his/her foot out of the stirrup. Compared with the conventional stirrup that can be opened and closed only in the direction of the pivot, the present invention has detachable engaging structures that are concave and convex configurations. The present invention provides a plurality of different kick directions to cooperate with the different angles of the foot in the stirrup when the rider intends to dismount the horse. It is safe for the rider to move his/her foot out of the stirrup.

Figure 13:
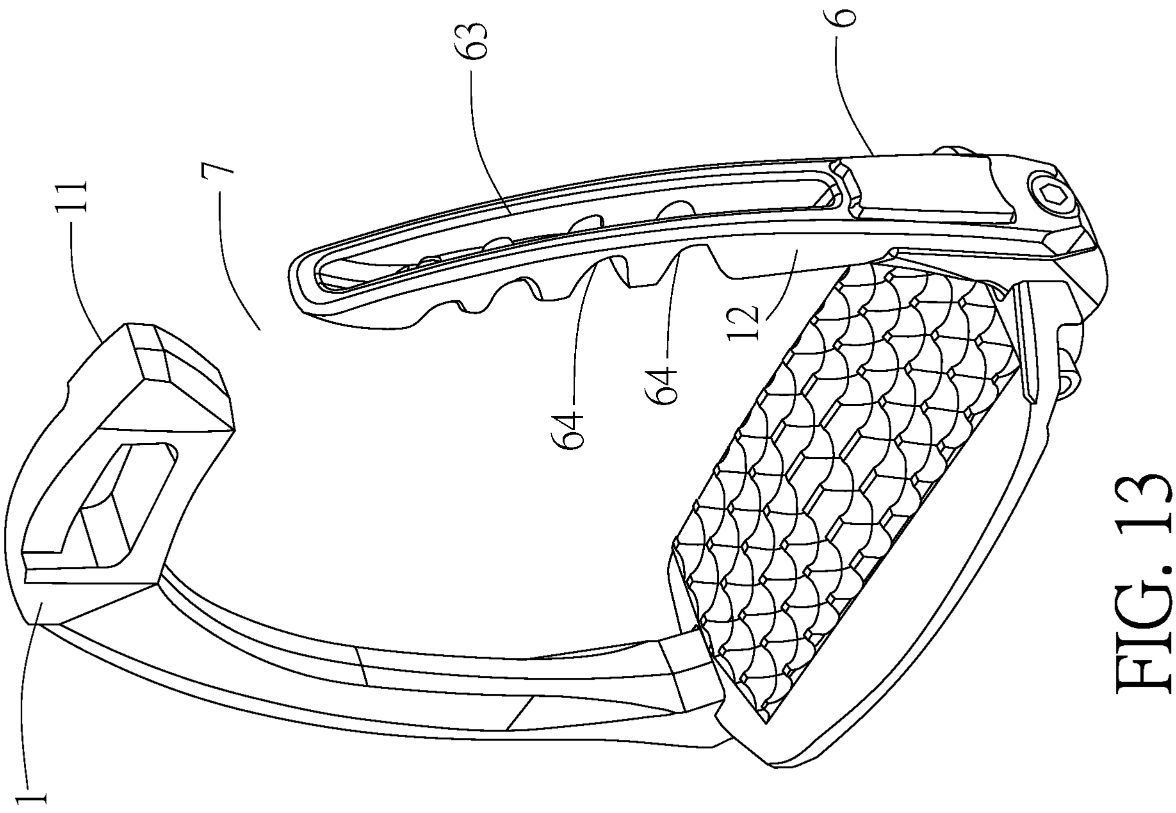
FIG. 13 is a perspective view according to a second embodiment of the present invention.
Figure 14:
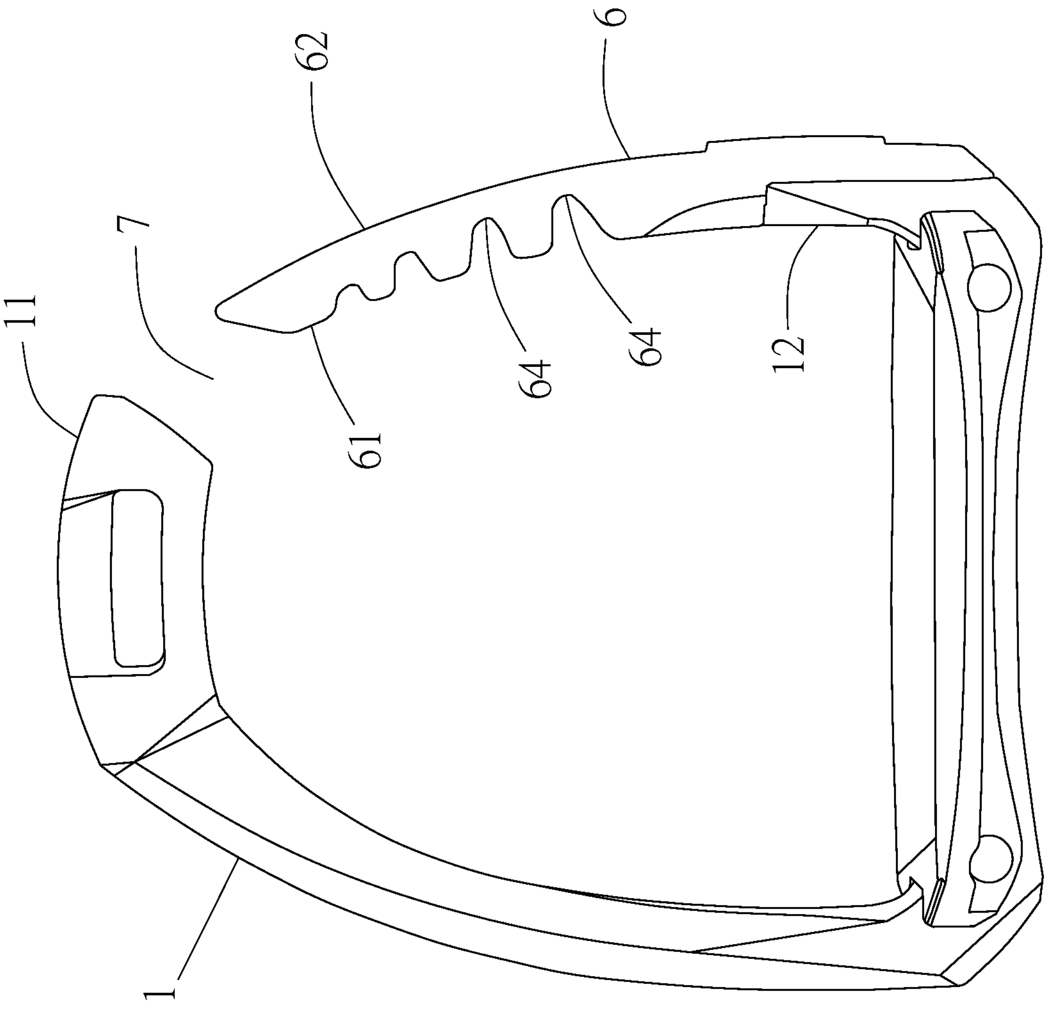
FIG. 14 is a planar view according to the second embodiment of the present invention.
Figure 15:
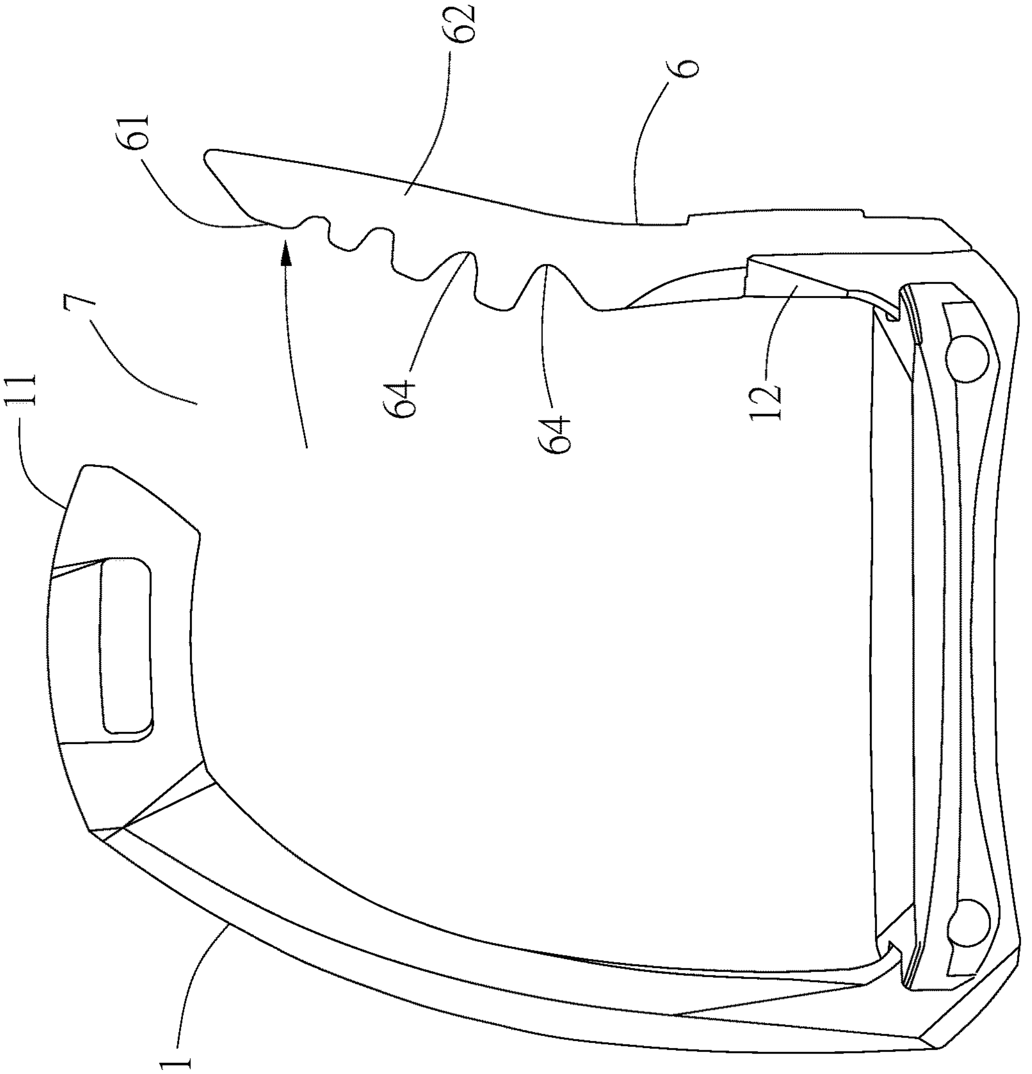
FIG. 15 is a schematic view according to the second embodiment of the present invention, wherein the side arm is curved outwardly.

FIGS. 13 to 15 illustrate a second embodiment of the present invention. The second embodiment is substantially similar to the first embodiment with the exceptions described below. A side arm 6 has an inner side 61 facing the space 16 and an outer side 62 opposite to the inner side 61. One end of the side arm 6 is connected to the second end 12 of the frame 1, and the other end of the side arm 6 is not connected to the first end 11 of the frame 1. A disengagement opening 7 is defined between the other end of the side arm 6 and the first end 11. The outer side 62 of the side arm 6 has a long hole 63 extending along the long axis of the side arm 6. The long hole 63 communicates with the indents 64. Thus, the side arm 6 is hollow to reduce its thickness, so it can be curved and deformed with ease.

With the structure of second embodiment of the present invention, when the rider is about to be in danger and intends to dismount the horse, through the chamfer formed on the side arm 6, the rider kicks the side arm 6 obliquely to apply a force that is perpendicular to the direction of the chamfer on the chamfer. The present invention provides a plurality of different kick directions to cooperate with the different angles of the foot in the stirrup when the rider intends to dismount the horse. It is safe for the rider to move his/her foot out of the stirrup.

In addition, as shown in FIG. 15, the other end of the side arm 6 is not connected to the first end 11 of the frame 1, and the disengagement opening 7 is defined between the other end of the side arm 6 and the first end 11. When the rider kicks the inner side 61 of the side arm 6 close to the disengagement opening 7, the side arm 6 is easily curved and deformed toward the outer side 62 via the indent 64 having a large opening. At this time, the rider can move his/her foot out of the stirrup from the disengagement opening 7. It is safe for the rider to move his/her foot out of the stirrup.

What is claimed is:

1. A stirrup having a deformable and detachable structure, comprising:

a frame, being C-shaped and having a first end and a second end facing the first end, an opening being defined between the first end and the second end, the frame having a first coupling portion adjacent to a bend of the second end, the frame surrounding a space, the second end of the frame having an upper end face, an inner wall adjacent to the upper end face and an outer retaining wall opposite to the inner wall, the upper end face having a recess extending downward, the inner wall having a notch communicating with the recess, the outer retaining wall being higher than the inner wall below a bottom edge of the notch in height;

a pedal, disposed on a bottom of the frame;

a side arm, made of a flexible material, the side arm having a second coupling portion, a connecting member being configured to connect the first coupling portion and the second coupling portion, the side arm having an inner side facing the space, the inner side having a plurality of indents arranged at intervals, the side arm further having a protrusion adjacent to one side of the second coupling portion, a groove being formed between the protrusion and the second coupling portion;

wherein, in a first state, the second coupling portion of the side arm is coupled to the first coupling portion of the frame, and the side arm is installed at the opening of the frame, when the protrusion of the side arm is engaged in the recess of the frame, the outer retaining wall of the frame is engaged with the groove of the side arm: in a second state, when an outward force is applied to the inner side of the side arm, the side arm is curved and deformed outwardly via the indents, in a third state, when the side arm is continuously curved and deformed outwardly by the outward force, the protrusion of the side arm is disengaged from the recess of the frame, the outer retaining wall of the frame is disengaged from the groove of the side arm, and the side arm is rotatable relative to the frame with a joint of the first coupling portion and the second coupling portion as a pivot.

2. The stirrup as claimed in claim 1, wherein the first end of the frame has an engaging groove, one end of the side arm, away from the second coupling portion, has an engaging block to be engaged with the engaging groove, the engaging block is hook-shaped and has a hook portion, an alcove is formed between the hook portion and the side arm, and the engaging groove has a raised portion to cooperate with the alcove for the engaging block to be engaged with the engaging groove.

3. The stirrup as claimed in claim 1, wherein the first coupling portion is recessed to form a chamber, the second coupling portion has a flange extending towards the chamber of the first coupling portion, and the flange corresponds in shape to the chamber for the flange to be engaged with the chamber.

4. The stirrup as claimed in claim 1, wherein a corner of the inner side of the side arm is chamfered to form at least one chamfer.

5. The stirrup as claimed in claim 1, wherein the side arm has an outer side opposite to the inner side, and the outer side has a plurality of indents arranged at intervals.

6. The stirrup as claimed in claim 1, wherein a transverse groove extending horizontally is formed on an underside of the pedal, and the transverse groove of the pedal is fitted on an outer periphery of the bottom of the frame.

7. The stirrup as claimed in claim 1, wherein the first coupling portion has a first coupling hole, the second coupling portion has a second coupling hole, and the connecting member is inserted in the first coupling hole and the second coupling hole for the side arm to be coupled to the frame.

8. The stirrup as claimed in claim 1, wherein the inner side of the side arm has a plurality of elongate holes adjacent to the respective indents along a long axis of the side arm.

9. The stirrup as claimed in claim 1, wherein the outer side of the side arm has a long hole extending along a long axis of the side arm, and the long hole communicates with the indents.

10. The stirrup as claimed in claim 1, wherein a center of an end face of the side arm, adjacent to the second end of the frame, bulges outwardly to form a first oblique conical surface, the second end of the frame bulges outwardly to form a second oblique conical surface opposite the first oblique conical surface, and top ends of the first oblique conical surface and the second oblique conical surface abut against each other so that at least one gap is formed between the first oblique conical surface and the second oblique conical surface.

* * * * *